May 29, 1956 D. G. SMITH 2,747,485
TRACTOR IMPLEMENT SUPPORTING ATTACHMENT
Filed March 2, 1953 2 Sheets-Sheet 1
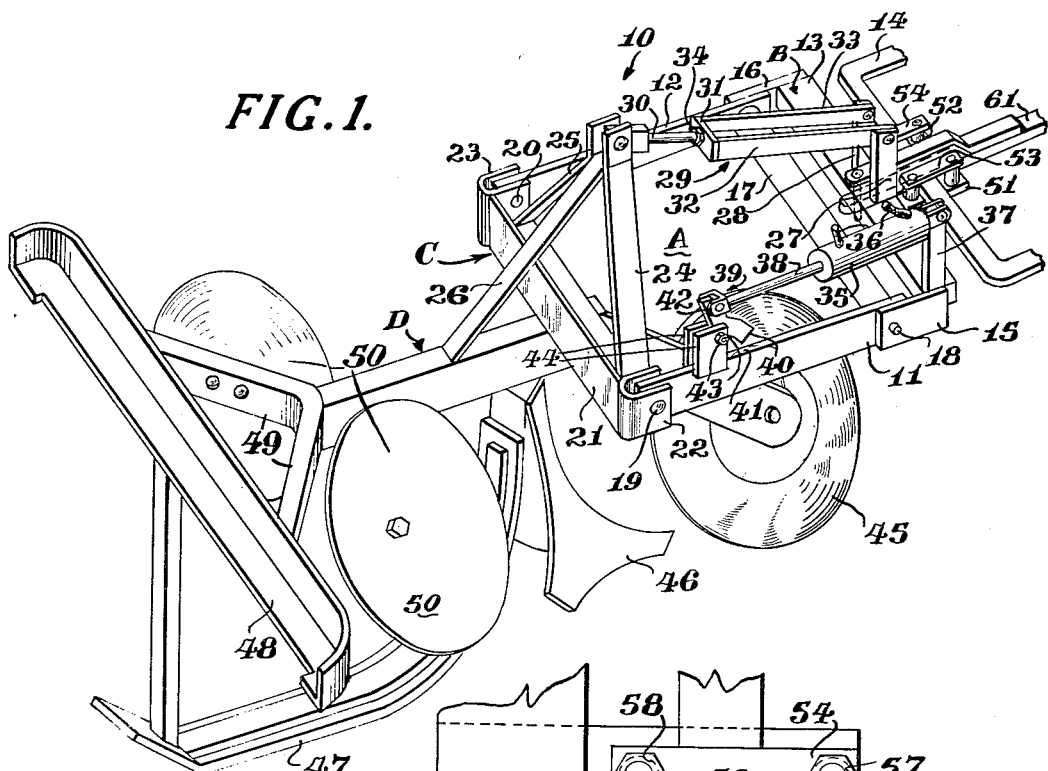
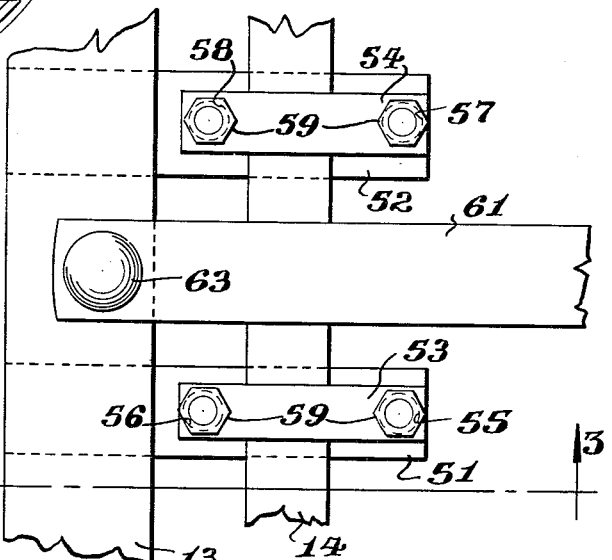
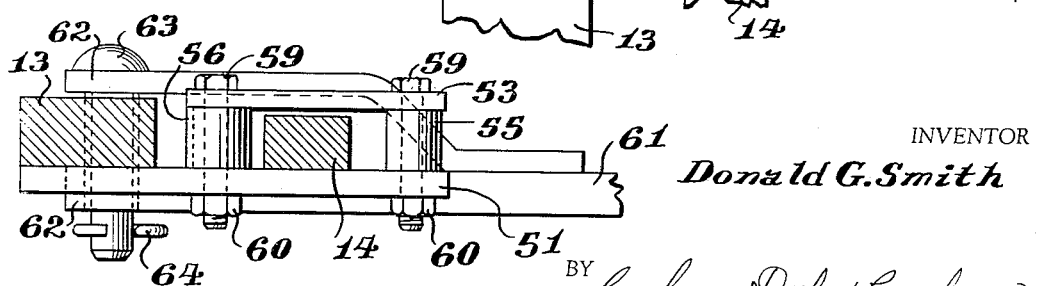
INVENTOR
*Donald G. Smith*
BY *Cushman, Darby & Cushman*
ATTORNEYS May 29, 1956 D. G. SMITH 2,747,485
TRACTOR IMPLEMENT SUPPORTING ATTACHMENT
Filed March 2, 1953 2 Sheets-Sheet 2

INVENTOR
*Donald G. Smith*

BY *Cushman, Darby & Cushman*
ATTORNEYS

2,747,485

TRACTOR IMPLEMENT SUPPORTING ATTACHMENT

Donald G. Smith, Jacksonville, Fla., assignor to Hester Plow Company, Inc., Jacksonville, Fla., a corporation of Florida Application March 2, 1953, Serial No. 339,515

5 Claims. (Cl. 97—46.59)

This invention relates in general to improvements in agricultural implements.

In particular the invention is directed to, and it is an object to provide, a novel device for permitting a mounted tractor plow to be raised clear of the ground by means of a hydraulic cylinder and yet when lowered into the ground to be free floating.

It is another object of this invention to provide a gag link which will allow a plow to seek its own depth when the tractor tilts forward or backward.

It is a further object of this invention to provide a gag link which will allow a plow to climb out and over obstacles without the use of a hydraulic cylinder to raise the plow clear of the same.

It is a still further object of the invention to produce a simple and inexpensive device, and yet one which will be exceedingly effective for the purpose for which it is designed.

Other objects and advantages of the invention will be apparent during the course of the following description.

These objects are accomplished by means of such structure and relative arrangement of parts as will fully appear by a study of the following specification and claims.

In the drawings similar characters of reference indicate corresponding parts in the several views, in which:

Figure 1 is a perspective view of the device showing the elements of the device in their relative positions to each other.

Figure 2 is a plan view of the means for hitching the device to a tractor.

Figure 3 is a fragmentary side elevation of the hitching means taken along the line 3—3 of Figure 2.

Figure 5:
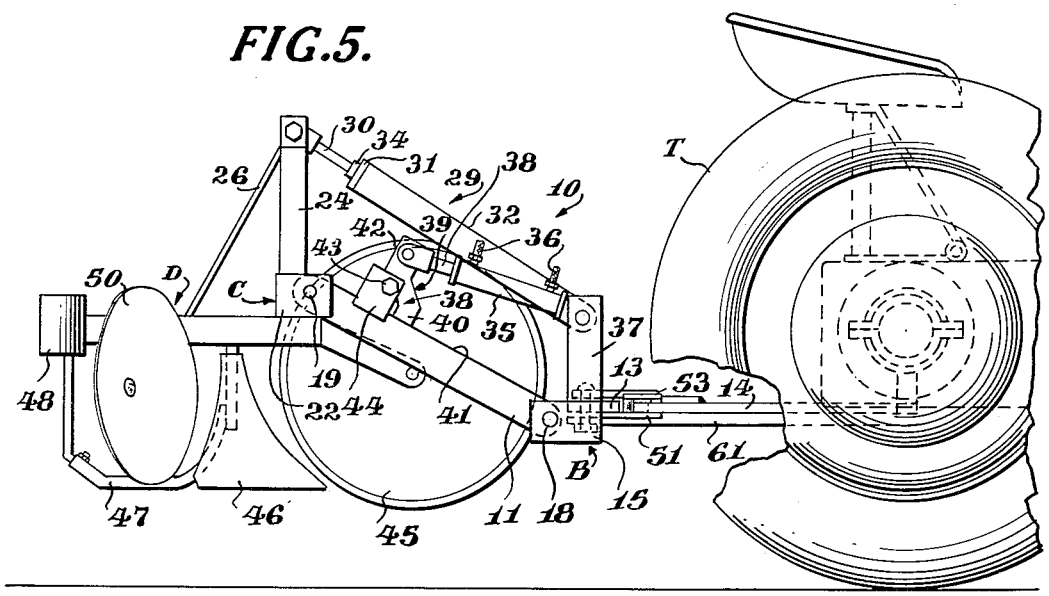
Figure 5 is a side elevation of the device in the raised position.

The invention comprises in general apparatus for attachment to a tractor and having forward and rearward frame portions pivotally joined together by linking arms. These arms permit the rearward portion of the frame to be raised and lowered in a vertical plane, while the inclination of the rearward frame portion itself is maintained substantially constant. The forward portion of the frame has means for attachment to the rear end of a tractor so as to permit limited horizontal pivotal movement of the entire frame.

Ground engaging implements are secured beneath the rearward portion of the frame, and positive elevating means are so secured to the frame htat the implements have limited free vertical movement as the tractor moves the apparatus over uneven terrain. This vertical or "free floating" movement enables the implements to automatically adjust to ground conditions and eliminates the need of the tractor operator to positively elevate the apparatus in order to clear obstacles such as might be encountered in the field during plowing operations.

Any desired combination of ground engaging tools may be suspended beneath the rearward portion of the frame, and where it is desirable to use a series of implements, an elongated beam may be so suspended to carry this additional apparatus. The rearward frame portion, in addition to being pivotally linked to the forward frame portion, is maintained in a horizontal position or any predetermined angle to the horizontal by suitable control means, and accordingly, implements suspended beneath the rearward frame portion assume and maintain the same position as the rearward frame portion.

When it is necessary to move from one work locale to another, this may be done expeditiously by positively elevating the rearward frame portion together with the attached ground engaging implements substantially above the ground, thereby considerably increasing the mobility of the tractor. The elevating means is controlled by the operator from his place on the tractor and comprises a hydraulic cylinder secured at one end to the forward non-elevating portion of the frame, and attached at the other end to the rearward elevating frame portion by means of lost motion linkage. It is this lost motion linkage which enables the ground engaging implements and rearward frame portion to achieve "free floating" movement, as will now be described in detail.

Referring now particularly to the characters of reference on the drawings, the invention, although adaptable to many types of implements, is here shown in a preferred embodiment of the invention.

The invention 10 with ground engaging implements attached is best illustrated in Figure 1, where the frame A is shown to comprise the forward frame portion B, adapted for attachment to the rear end of a tractor T (Figures 4 and 5), the rearward frame portion C (Figure 1) pivotally connected to forward frame portion B by connecting arms 11 and 12, and implement supporting beam D which is secured to the under side of frame portion C.

Referring to the drawings more in detail, and in particular to Figure 1, forward frame portion B is a horizontally disposed, U-shaped member comprising a transverse draw bar 13 adapted to be secured to the cross bar 14 of a tractor T (Figures 4 and 5), as will be more fully described below. Secured to each end of draw bar bracket 13 are rectangularly shaped side plates 15 and 16 adapted to pivotally receive the forward end portions of side arms 11 and 12. A roll 17 (Figure 1) is placed intermediate the end portions of side arms 11 and 12 having pins 18 projecting from each end of the roll 17 for pivotally securing side arms 11 and 12 to side plates 15 and 16 respectively.

Rearward frame portion C is pivotally secured to the opposite ends of side arms 11 and 12 by means of pivotal fasteners 19 and 20 respectively. This rearward frame portion C is comprised of a transverse structural member 21 which has U-shaped brackets 22 and 23 integrally secured to each end of this structural member. These last mentioned ends portions of arms 11 and 12 are received within the open ends of the U-shaped brackets 22 and 23 and are pivotally secured thereto by the afore-mentioned pivotal fastenings 19 and 20. Upstanding from structural member 21 is an A frame comprising inclined legs 24 and 25 rigidly secured at their lower portions to the outside ends of the structural member, and secured at their upper portions to each other forming the apex of the A frame. A third leg 26 is secured at its upper end between the upper ends of side legs 24 and 25, and extends rearwardly, and is inclined downwardly, terminating with its lower end integrally secured to implement supporting beam D.

Having described the basic elements of frame A, the means for maintaining rearward frame portion C in the horizontal position, or in any predetermined position angularly displaced from the horizontal, will now be described. Still referring to Figure 1, upstanding from the center top portion of draw bar 13 are a pair of posts 27 and 28 placed to serve as an anchor bracket for an adjustable leveling arm 29. Arm 29 is pivotally secured at one end to the apex of the A frame formed by legs 24 and 25, and at the other end to the top portions of these aforementioned upstanding posts 27 and 28. This leveling arm 29 comprises a threaded stud member 30 one end of which is secured to the apex formed by legs 24 and 25 and the other end threadedly engaging a transverse piece 31 which is used to space apart and align legs 32 and 33 at one end so as to conform with the spacing of the opposite ends of these legs which are pivotally secured to the top portions of upstanding posts 27 and 28 respectively. With this leveling arm 29 pivotally secured at one end to the apex of legs 24 and 25, and at the opposite end to posts 27 and 28, the angle which these legs make with the horizontal may be adjusted and maintained by adjusting the position of stud 30 in transverse piece 31.

This adjustment is maintained by means of a lock nut 34. As the rearward portion of the frame C is raised or lowered, side arms 11 and 12 pivot about pins 18 at their lower ends, and structural member 21 integrally secured to U-shaped brackets 22 and 23 pivots about the upper ends of side arms 11 and 12 on pivotal fastenings 19 and 20 respectively. Thus, it may be seen that as rearward portion C is raised or lowered leveling arm 29, in combination with the A frame formed by legs 24 and 25, and the pivotal U-shaped brackets 22 and 23, cooperates to maintain frame portion C at the predetermined angle established by adjusting the threaded stud 30.

A two-way hydraulic cylinder 35 is employed to perform the above described raising and lowering operations. The controls on the tractor T (Figures 4 and 5) for actuating this hydraulic cylinder are not shown, but hose portions 36 connect to the controls which are conveniently located on the tractor near the operator so that he can perform this operation with dispatch. In order to provide suitable leverage for raising the frame portion C, hydraulic cylinder 35 is pivotally secured at one end to the top portion of an upstanding post 37 which is rigidly secured at its lower end to the top face of draw bar 13. The piston rod 38 of hydraulic cylinder 35 extends rearwardly from this cylinder body and is pivotally secured to the top portion of a lost motion gag link 39. When the frame is in the raised position (Figure 5) lower end 40 of gag link 39 is in abutting relationship with the top edge 41 of side arm 11. The gag link 39 is pivotally secured intermediate top portion 42 and bottom portion 40 by means of a transverse pin 43 which supports the gag link between a pair of upstanding posts 44 (Figure 1) integrally secured, such as by welding means, to the opposite side portions of side arm 11.

Various ground engaging implements may be secured and suspended beneath structural member 21 (Figures 1, 4 and 5), and if these implements are to be used in combination or in series, implement supporting beam D may be provided which is directly attached to structural member 21 wherein the ground engaging implements depend from beam D. The arrangement shown in Figure 1 comprises a series of plowing devices consisting of a coulter blade 45 which in operation is centrally disposed immediately beneath frame A. Just rearward of transverse member 21 and depending from beam D is a middle buster 46. Adjacent the rear vertical surface of middle buster 46 and secured on one end to the underside of beam D is a skid 47 which extends in an inclined manner downwardly and rearwardly to about the horizontal plane of the undersurface of middle buster 46 rearwardly at this level and then upwardly for attachment to a transversely disposed bumper 48. This bumper which is rigidly secured to the rear end portion of beam D by means of Y-shaped structural member 49, is provided to safeguard the agricultural implements from damage when the frame is in the raised position and the operator is backing the apparatus into place prior to lowering. Intermediate the middle buster 46 and bumper 48 are a pair of plow disks 50 secured on opposite sides of beam D. It is contemplated that many other arrangements of tools may satisfactorily be used with this invention.

Reference is now made to Figures 2 and 3, and the means for securing this apparatus to the end of the tractor is now described in detail. A pair of spaced rigid bottom plates 51 and 52 are integrally secured to the undersurface of the center portion of draw bar 13, and extend forward so as to pass beneath the undersurface of the tractor cross bar 14. The means for securing these bottom plates 51 and 52 to the tractor cross bar 14 comprises the use of top plates 53 and 54 spaced above and vertically apart from bottom plates 51 and 52 respectively by means of bushings 55—58. Top plates 53 and 54 straddle tractor cross bar 14 and are secured on each side of the tractor cross bar to bottom plates 51 and 52 by means of suitable threaded fastenings such as bolts 59 (Figure 3), passing through top plates 53 and 54, bushings 55—58 and bottom plates 51 and 52 to the undersides thereof whereupon they are locked in place by nuts 60. Top plates 53 and 54 are spaced above cross bar 14 so as not to contact this cross bar, and likewise bushings 55—58 are spaced laterally of cross bar 14 so as to leave the cross bar free from movement between the laterally spaced bushings. This above described structure limits the horizontal angle through which the frame may pivot with respect to tractor cross bar 14, and also acts to relieve the stresses on pin 63 and yoke 62 which will now be described.

The positive connection of the draw bar 13 to tractor T is the swinging draw bar 61 (Figures 2 and 3). This tractor swinging draw bar 61 is joined to the apparatus draw bar 13 by a pin and yoke arrangement comprising a yoke 62 secured to the free end of the tractor swinging draw bar 61 and adapted to receive the center portion of apparatus draw bar 13 therebetween. A pin 63 passes through the upper portion of the yoke through a hole in the apparatus draw bar 13, and through the bottom portion of the yoke 62, wherein the apparatus 10 is free to pivot about pin 63 within the limits defined by bottom plates 51 and 52, top plates 53 and 54 and laterally spaced bushings 55—58. The pin 63 may be held in place by a cotter pin 64 (Figure 3) or other suitable means. Thus it may be seen that the apparatus 10 may move transversely within the limits of the pivotal movement of the tractor swinging draw bar 61, and may further pivot transversely to a limited extent about pin 63 of yoke 62.

Figure 4:
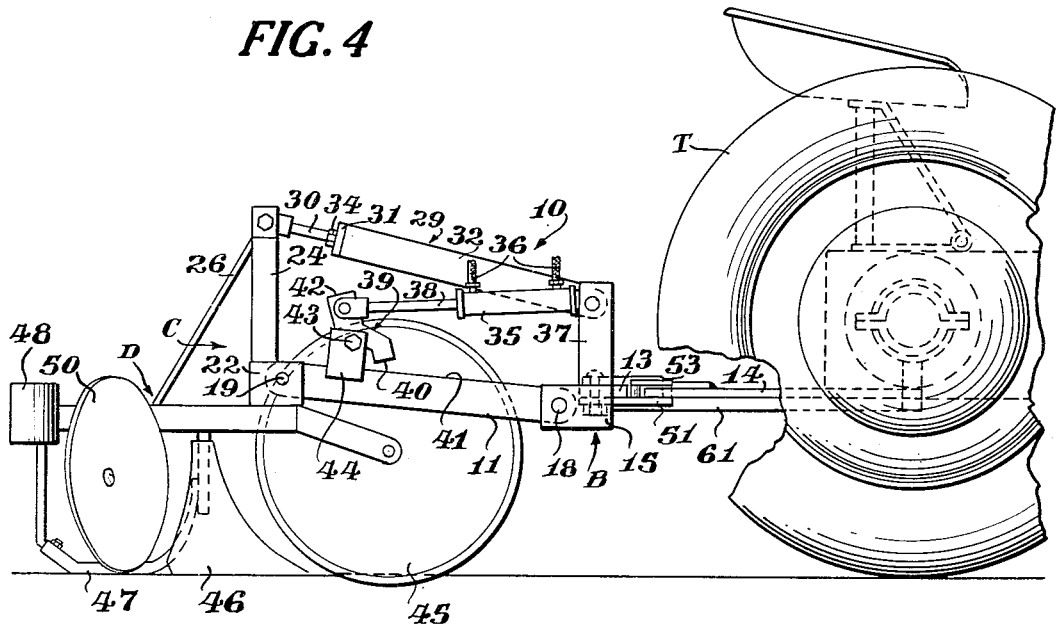
Figure 4 is a side elevation of the device in the free floating position.

Referring now to Figures 4 and 5, the "free floating" action of the apparatus will now be described. Figure 4 shows the apparatus in the operating position wherein ground engaging, agricultural implements such as coulter blade 45 are supporting frame portion C. Figure 5 shows the frame in the elevated position wherein the agricultural implements are supported by the frame and in particular by rearward frame portion C. In this raised position (Figure 5), the agricultural implements exert a downward pressure on the frame, and in particular the rearward portion C. The lower portion 40 of gag link 39 is then in abutting contact with the top edge 41 of side arm 11. As the hydraulic cylinder 35 is actuated to lower the frame this relationship of gag link 39 to the side arm 11 continues to exist until the agricultural implements, such as the coulter blade 45, make contact with the ground and begin to support the frame portion C. At this time further outward movement of piston cylinder 38 toward the rear of the apparatus will cause gag link 39 to pivot about pin 43 whereupon lower portion 40 is rotated away from its abutting contact with the top edge 41 of side arm 11 (Figure 4). This outward movement of piston 38 is continued until the pivotal connection of piston rod 38 with upper portion 42 of the gag link 39 is rearward of pivotal pin 43. In this position, rearward frame portion C is free floating, and any vertical movement of the ground engaging implements will be taken up by the lost motion action of upper portion 42 of gag link 39 between pin 43 and the pivotal connection of piston 38. Thus it may be seen that the gag link upper arm 42 will describe an arcuate upward and downward path as the upward and downward movement of the agriculture implements relay this movement to structural member 21 of frame portion C (Figure 1). Accordingly, once the apparatus is lowered to the ground, it is not necessary for the operator to further actuate the hydraulic cylinder from his position on the tractor since the gag link 39 automatically compensates for vertical movement of the apparatus due to unevenness of the terrain, and contact with stones, boulders and other such obstructions.

When an operation such as plowing has been completed the implements may be raised clear of the ground by the operator causing cylinder piston 38 to withdraw into cylinder housing 35, wherein gag link 39 is rotated forwardly about pin 43 until lower portion 40 again makes abutting contact with the top edge 41 of side arm 11. Thereafter, further forward movement of the piston 38 elevates the frame C and the implements, for instance, to the position shown in Figure 5.

Leveling arm 29 is bifurcated, as above described and shown in Figure 1, in order to avoid interference with coulter blade 45 when in the raised position, and to provide a more compact and rugged apparatus for transporting purposes.

When it is desirable to have the implements dig deeper into the ground, leveling arm 29 is shortened, thereby causing rearward frame portion C to tilt forwardly thus relieving the pressure on the skid 47. The plow will then go deeper until the pressure of the ground becomes great enough to hold the plow. To achieve the opposite result i. e. obtain a more shallow contact with the ground, leveling arm 29 is lengthened, frame portion C is pivoted rearwardly, and the rearward end portion of frame D is lowered correspondingly, whereby the implements do not plow so deeply.

Thus the use of gag link 39 by means of this invention provides for means to lower a ground engaging implement into the ground, and to adjust automatically to the changing ground conditions encountered as the tractor pulls the device forward, without the need of the operator to constantly compensate for these conditions by manual operation of the two-way hydraulic cylinder controls. This gag link 39 also allows the implement to seek its own depth as the tractor leans forward or backward when traveling over hilly or rough terrain. The gag link also allows the implement to climb over obstacles without requiring the operator to raise the implement clear of such obstacles by use of this hydraulic cylinder controls.

The depth desired for plowing is obtained by adjusting the length of leveling arm 29, which adjustment changes the level of the implement, allowing it to seek its own depth by means of pressure on skid 47.

It is to be understood that the form of my invention herewith shown and described is to be taken as a preferred example of the same and that various changes in shape, size and arrangement of parts may be resorted to without departing from the spirit of my invention or the scope of the subjoined claims.

I claim:

1. An agricultural apparatus for bearing ground engaging implements and adapted to be drawn by a tractor, comprising a frame having spaced side members and transverse front and rear members pivotally secured to the front and rear ends of said side members respectively, an upstanding post secured to one of said side members, a bell crank-shaped lost motion link having one upstanding arm and one downwardly extending arm, said link being pivotally mounted on said post, means secured to said upstanding arm for rotating said link to a position wherein said downwardly extending arm engages said last mentioned side member, said means being secured to said transverse front member whereby said side members and said rear transverse member will be raised about said first transverse member upon continued operation of said means.

2. The apparatus defined in claim 1, said front transverse member having an upstanding post secured thereto, said means for rotating said rear transverse member comprising a two-way hydraulic cylinder assembly pivotally secured at one end to said link upstanding arm and at the opposite end to said post.

3. The apparatus defined in claim 1, said rear transverse member having an implement supporting beam secured thereto and extending rearwardly therefrom, and implement leveling means comprising an upstanding A frame secured to said rear transverse member, a pair of spaced upstanding posts secured to said front transverse member, and an extensible leveling arm pivotally secured at one end to the apex of said A frame and at the opposite end to said upstanding posts, said leveling arm being bifurcated to receive an implement therebetween when said rear transverse member is in a raised position.

4. The apparatus defined in claim 3, wherein a coulter blade depends from said beam forward of said rear transverse member and is disposed to be received within said bifurcated leveling arm when said rear transverse member is in a raised position.

5. The apparatus defined in claim 3, said beam having a bumper secured transversely thereto remote from said frame, an inclined skid extending downwardly and rearwardly from said beam, and then upwardly for rigid attachment to said bumper, a pair of plow discs secured on opposite sides of said beam and intermediate said bumper and said frame, a middle buster forward of said plow discs, and a coulter blade depending from said beam forward of said rear transverse member, and disposed to be received between said bifurcated leveling arm when said rear transverse member is in the raised position.

References Cited in the file of this patent

UNITED STATES PATENTS

| | | |
|---|---|---|
| 1,811,733 | Taylor | June 23, 1931 |
| 2,153,038 | Corbett | Apr. 4, 1939 |
| 2,394,210 | Sherman | Feb. 5, 1946 |
| 2,533,521 | Silver | Dec. 12, 1950 |
| 2,575,622 | Fraga | Nov. 20, 1951 |
| 2,593,679 | Kaupke | Apr. 22, 1952 |
| 2,602,389 | Markel | July 8, 1952 |
| 2,619,016 | Dooley | Nov. 25, 1952 |
| 2,622,499 | Fraga | Dec. 23, 1952 |